(12) United States Patent
Otsuka (10) Patent No.: US 11,097,789 B2
(45) Date of Patent: Aug. 24, 2021

(54) STRUCTURAL MEMBER FOR AUTOMOBILES AND METHOD FOR PRODUCING THE SAME

(71) Applicant: NIPPON STEEL CORPORATION, Tokyo (JP)

(72) Inventor: Kenichiro Otsuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 77 days.

(21) Appl. No.: 16/497,296

(22) PCT Filed: Apr. 10, 2018

(86) PCT No.: PCT/JP2018/014988
§ 371 (c)(1),
(2) Date: Sep. 24, 2019

(87) PCT Pub. No.: WO2018/190316
PCT Pub. Date: Oct. 18, 2018

(65) Prior Publication Data
US 2020/0094886 A1 Mar. 26, 2020

(30) Foreign Application Priority Data
Apr. 10, 2017 (JP) ............................. JP2017-077259

(51) Int. Cl.
*B62D 25/00* (2006.01)
*B62D 29/00* (2006.01)
(Continued)

(52) U.S. Cl.
CPC ......... *B62D 29/007* (2013.01); *B21D 22/022* (2013.01); *B62D 21/15* (2013.01);
(Continued)

(58) Field of Classification Search
CPC ..................................................... B62D 25/00
See application file for complete search history.

(56) References Cited

U.S. PATENT DOCUMENTS 2,132,002 A * 10/1938 Hight .................. B21D 53/265
29/894.362
5,996,633 A * 12/1999 Kato .................... F28D 1/0316
138/38
(Continued)

FOREIGN PATENT DOCUMENTS

EP 1 792 670 A1 6/2007
GB 2344546 * 6/2000
(Continued)

OTHER PUBLICATIONS

International Search Report for PCT/JP2018/014988 dated Jun. 26, 2018.

*Primary Examiner* — Dennis H Pedder
(74) *Attorney, Agent, or Firm* — Birch, Stewart, Kolasch & Birch, LLP (57) ABSTRACT

A structural member for automobiles to be disclosed includes a press formed product. The press formed product includes two vertical wall sections and a top plate section that joins the two vertical wall sections to each other. At least part of the top plate section is provided with a protruding section that is a steel sheet extending from the top plate section and so folded over against itself as to protrude. The protruding section protrudes from the top plate section toward the interior of the press formed product and extends along the longitudinal direction of the press formed product. With the thus configured structural member, a structural member for automobiles that has a good characteristic in a three-point bending test is provided.

2 Claims, 11 Drawing Sheets

(51) Int. Cl.
    *B21D 22/02*     (2006.01)
    *B62D 21/15*     (2006.01)
    *B62D 65/00*     (2006.01)
    *B60J 5/04*     (2006.01)
    *B60R 19/04*     (2006.01)
    *B62D 25/02*     (2006.01)
    *B62D 25/04*     (2006.01)
    *B62D 25/06*     (2006.01)

(52) U.S. Cl.
    CPC ............. B62D 25/00 (2013.01); B62D 65/00 (2013.01); *B60J 5/0411* (2013.01); *B60R 19/04* (2013.01); *B62D 25/025* (2013.01); *B62D 25/04* (2013.01); *B62D 25/06* (2013.01)

(56) References Cited

U.S. PATENT DOCUMENTS

2002/0140239 A1     10/2002     Kettler et al.
2014/0138985 A1     5/2014     Oh

FOREIGN PATENT DOCUMENTS

| | | |
|---|---|---|
| JP | 2013-27894 A | 6/2007 |
| JP | 2008-155749 A | 7/2008 |
| JP | 2008-265609 A | 11/2008 |
| JP | 2010-149174 A | 7/2010 |
| JP | 2011-67841 A | 4/2011 |
| JP | 5375086 B2 | 12/2013 |

\* cited by examiner

Sample 2 (Inventive Example Of Present Invention)

FIG. 7B

Sample 3 (Inventive Example Of Present Invention)

FIG. 7C

Sample 1 (Comparative Example)

FIG. 7D

Sample 4 (Comparative Example)

Sample 1 (Comparative Example)

FIG. 11B

Sample 2 (Inventive Example Of Present Invention)

STRUCTURAL MEMBER FOR AUTOMOBILES AND METHOD FOR PRODUCING THE SAME

TECHNICAL FIELD

The present invention relates to a structural member for automobiles and a method for producing the same.

BACKGROUND ART

A vehicle body of an automobile is formed of a variety of structural members joined to each other. Most of the structural members are each formed by press-forming a steel sheet. In recent years, a structural member for automobiles (continuous length member, in particular) is required to have a good characteristic in a three-point bending test for increased collision safety performance. To this end, a variety of proposals have been made.

For example, Patent Literature 1 (Japanese Patent Application Publication No. 2008-265609) and Patent Literature 2 (Japanese Patent Application Publication No. 2008-155749) each disclose with reference to drawings an impact absorbing member including a portion where a steel sheet is folded over three times.

Patent Literature 3 (Japanese Patent Application Publication No. 2011-67841) presents a part having a hat-shaped cross section having a large number of ridges as an example of a part that provides high collision safety. Patent Literature 4 (Japanese Patent Application Publication No. 2013-27894) discloses a frame part including a reinforcing section formed in a portion where a top wall section is connected to vertical wall sections. The reinforcing section is formed of a circularly folded section having a tubular shape.

Patent Literature 5 (Japanese Patent No. 5,375,086) discloses a hollow frame body formed by roll forming. The hollow frame body has an edge section that receives a compressive load, and the edge section is provided with an inward rib so folded over that the folded sections are folded against one another in the form of a mountain shape.

CITATION LIST

Patent Literature

[Patent Literature 1] Japanese Patent Application Publication No. 2008-265609
[Patent Literature 2] Japanese Patent Application Publication No. 2008-155749
[Patent Literature 3] Japanese Patent Application Publication No. 2011-67841
[Patent Literature 4] Japanese Patent Application Publication No. 2013-27894
[Patent Literature 5] Japanese Patent No. 5,375,086

SUMMARY OF INVENTION

Technical Problem

Using a structural member having a good characteristic in a three-point bending test allows an increase in collision safety performance of an automobile and a decrease in the weight of the automobile. A novel structural member having a good characteristic in a three-point bending test is therefore currently required. Under the situations described above, an object of the present invention is to provide a structural member having a good characteristic in a three-point bending test.

Solution to Problem

A structural member according to an embodiment of the present invention is a structural member for automobiles including a press formed product formed of a single steel sheet and having an open cross section. The press formed product includes two vertical wall sections and a top plate section that joins the two vertical wall sections to each other. At least part of the top plate section is provided with a protruding section that is the steel sheet extending from the top plate section and so folded over against itself as to protrude. The protruding section protrudes from the top plate section toward an interior of the press formed product and extends along a longitudinal direction of the press formed product.

A production method according to another embodiment of the present invention is a method for producing the structural member for automobiles according to the embodiment described above. The production method includes a first step of forming a preformed product including two first sections that form the two vertical wall sections, two second sections that form the top plate section, and a third section that forms the protruding section by deforming a single blank steel sheet and a second step of forming the two vertical wall sections, the top plate section, and the protruding section by press-forming the preformed product. The third section is disposed between the two second sections and bulges out from the two second sections toward an interior of the preformed product. The second step includes a step (i) of placing two movable punches in the interior of the preformed product in such a way that the two movable punches sandwich the third section and a step (ii) of forming the protruding section by pushing the two movable punches externally via the two first sections to allow the two movable punches to sandwich the third section.

Advantageous Effects of Invention

According to the present invention, a structural member having a good characteristic in a three-point bending test is provided. Using the structural member according to the present invention allows an increase in collision safety performance of an automobile and a decrease in the weight of the automobile.

DESCRIPTION OF EMBODIMENTS

As a result of intensive studies, the inventor of the present application has newly found that a specific structure improves the characteristic in a three-point bending test. The present invention is based on the novel finding.

An embodiment of the present invention will be described below. The following description will be made of the embodiment of the present invention with reference to an example, but the present invention is not limited to the example described below. In the following description, specific numerals and materials are presented by way of example in some cases, but other numerals and materials that provide the effects of the present invention may be used. In the present specification, the term "cross section" means a cross section perpendicular to the direction in which a press formed product (P) extends (longitudinal direction) unless otherwise particularly described.

Structural Member for Automobiles

The structural member according to the present embodiment is a structural member for automobiles. The structural member includes a press formed product formed of a single steel sheet and having an open cross section. The structural member and the press formed product are referred in the following description to as a "structural member (S)" and a "press formed product (P)" in some cases.

The press formed product (P) includes two vertical wall sections and a top plate section that joins the two vertical wall sections to each other. At least part of the top plate section is provided with a protruding section that is a steel sheet extending from the top plate section and so folded over as to protrude. In the following description, the protruding section is referred to as a "protruding section (Q)" in some cases. The protruding section (Q) protrudes from the top plate section toward the interior of the press formed product (P) and extends along the longitudinal direction of the press formed product (P).

The interior of the press formed product (P) means the area surrounded by the two vertical wall sections, the top plate section, and an imaginary plane that connects the edges of the two vertical wall sections to each other.

The press formed product (P) can be formed by deforming a single steel sheet (blank steel sheet). The blank steel sheet, which is the material of the press formed product (P), will be described later.

The cross section of the press formed product (P) excluding the protruding section (Q) may include a U-letter-shaped portion having a roughly flat bottom. In a case where the press formed product (P) includes flange sections, the cross section of the press formed product (P) excluding the protruding section (Q) may have a roughly hat shape.

From the viewpoint of collision safety and weight reduction, the steel sheet that forms the press formed product (P) preferably has high tensile strength. The tensile strength of the steel sheet may be 340 MPa or more (for example, 490 MPa or more, 590 MPa or more, 780 MPa or more, 980 MPa or more, or 1200 MPa or more). The upper limit of the tensile strength is not limited to a specific value and may be 2500 MPa or less.

The press formed product (P) typically has an elongated shape as a whole. The vertical wall sections, the top plate section, and flange sections, which will be described later, each extend along the longitudinal direction of the press formed product (P). The protruding section (Q) may be formed over the entire press formed product (P) in the longitudinal direction or only part of the press formed product (P) in the longitudinal direction.

The top plate section connects the two vertical wall sections to each other. From another viewpoint, the top plate section is a lateral wall section that connects the two vertical wall sections to each other. Therefore, in the present specification, the top plate section and the lateral wall section can be interchangeably used. In a case where the press formed product (P) is so disposed that the lateral wall section (top plate section) faces downward, the lateral wall section can also be called a bottom plate section. In the present specification, however, the lateral wall section is referred to as the top plate section with a case where the lateral wall section faces upward taken as a reference.

The angle between the top plate section and each of the vertical wall sections is typically 90° or a value close thereto. The angle may be less than 90° but is typically 90° or more or may be in the range from 90° to 150°. The two angles between the two vertical wall sections and the top plate section may differ from each other but is preferably roughly equal to each other (difference therebetween falls within 10°) or may be equal to each other.

The steel sheets folded over against each other to form the protruding section (Q) are typically in close contact with each other. A gap between the steel sheets, if present, is a very narrow gap, and the size of the gap is, for example, 1 mm or less, preferably 0.5 mm or less. Some press formed products of related art each have a groove-shaped recess formed in the top plate section, but the protruding section (Q) in the present embodiment differs from such a groove-shaped recess.

The top plate section is typically provided with only one protruding section (Q). It is, however, noted that the top plate section may be provided with a plurality of protruding sections (Q). The protruding section (Q) is typically so formed as to protrude perpendicularly to the top plate section.

A width WQ of the protruding section (Q) may be in the range from 0.05 to 0.95 times a height HT of the vertical wall sections or may be in the range from 0.05 to 1.50 times the height HT. In a case where the multiplication factor is more than 1.0, the width WQ is greater than the height HT of the vertical wall sections. The width WQ and the height HT will be described with reference to FIG. 2.

The protruding section (Q) may be formed at the center of the top plate section in the width direction thereof. The protruding section (Q) may instead be formed in a position different from the center of the top plate section in the width direction thereof.

Now define the width of the top plate section as WT, and it is assumed that the protruding section (Q) is separate by a distance L from a center CT of the top plate section in the width direction thereof. In the assumption, the distance L may be in the range from 0.05 to 0.45 times the width WT. The width WT and the distance L will be described with reference to FIG. 3.

The steel sheets folded over against each other to form the protruding section (Q) may be fixed to each other. For example, the steel sheets folded over against each other to form the protruding section (Q) may be welded to each other or may be fixed to each other by using another method. Examples of the welding may include resistance spot welding, laser welding, and arc welding.

The press formed product (P) may include two flange sections extending from the edges of the two vertical wall sections, respectively. In this case, the cross section of the press formed product (P) excluding the protruding section (Q) has, for example, a roughly hat shape. The flange sections typically extend in a direction roughly parallel to the top plate section.

The structural member (S) according to the present embodiment may further include another member. Another member is hereinafter referred to as a "member (M)" or an "another member (M)" in some cases. The member (M) is fixed to the press formed product (P). The method for fixing the member (M) is not limited to a specific method and may be welding or another fixing method. Examples of the welding may include the examples described above.

The member (M) may be so fixed to the press formed product (P) that the press formed product (P) and the member (M) form a closed cross section. In other words, the member (M) may close the opening of the press formed product (P) having an open cross section. For example, the member (M) may be so fixed to the two flange sections of the press formed product (P) that the press formed product (P) and the member (M) form a closed cross section. From another viewpoint, the member (M) may be so fixed to the two flange sections of the press formed product (P) that the press formed product (P) and the member (M) form a hollow body.

The member (M) may be a metal plate or may, for example, be a steel sheet. The member (M) may be formed of a steel sheet of the same type of the steel sheet that forms the press formed product (P). The member (M) may be a plate-shaped member called a backing plate or a formed product subjected to press forming. For example, the member (M) may have shape of the same type of the press formed product (P) including two flange sections. In this case, the two flange sections of the press formed product (P) and the two flange sections of the member (M) can be fixed to each other.

The structural member (S) according to the present embodiment may be a bumper, a side sill, a center pillar, an A pillar, a roof rail, a roof arch, a beltline reinforcement, or a door impact beam. The structural member (S) may instead be another structural member for automobiles.

Method for Producing Structural Member for Automobiles

A production method according to the present embodiment will be described below. The production method is a method for producing the structural member (S) according to the present embodiment. An item described with reference to the structural member (S) according to the present embodiment is applicable to the production method according to the present embodiment, and no duplicated description will therefore be made in some cases. Similarly, an item described with reference to the production method according to the present embodiment is applicable to the structural member (S) according to the present embodiment.

The production method according to the present embodiment includes a first step and a second step. The first step is the step of forming a preformed product including two first sections that form the two vertical wall sections, two second sections that form the top plate section, and a third section that forms the protruding section by deforming a single blank steel sheet. Typically, in the preformed product, no clear boundaries are present among the first to third sections. Some boundary may instead be present among the first to third sections. The first step is not limited to a specific step and may be carried out by using known press forming.

The second step is the step of forming the two vertical wall sections, the top plate section, and the protruding section by press-forming the preformed product. The third section is disposed between the two second sections and bulges out from the two second sections toward the interior of the preformed product. The "interior of the preformed product" means the area corresponding to the interior of the press formed product (P) described above.

The second step includes a step (i) and a step (ii). The step (i) is the step of placing two movable punches in the interior of the preformed product in such a way that the two movable punches sandwich the third section. In one example, the two movable punches are so disposed as to extend along the first and second sections.

The step (ii) is the step of forming the protruding section by pushing the two movable punches externally via the two first sections to allow the two movable punches to sandwich the third section. The second step is thus carried out to produce the press formed product (P). The press formed product (P) produced by carrying out the second step may further undergo post-processing.

In the following description, the steel sheet that is a start material (blank steel sheet) is referred to as a "blank" in some cases. The blank is typically a flat-plate-shaped steel sheet and has a plan shape according to the shape of the press formed product (P) to be formed. The thickness and physical properties of the blank are selected in accordance with characteristics required for the press formed product. The thickness of the blank may be in the range, for example, from 0.4 to 4.0 mm or from 0.8 to 2.0 mm. The wall thickness of the press formed product (P) is determined by the thickness of the blank and the step of processing the blank and may fall within the range of the blank thickness presented by way of example in the description.

The blank is preferably a high-tension steel sheet (high-tension material) having a tensile strength of 340 MPa or more (for example, 490 MPa or more, 590 MPa or more, 780 MPa or more, 980 MPa or more, or 1200 MPa or more). To reduce the weight of the structural member, the blank preferably has high tensile strength, more preferably has a tensile strength of 590 MPa or more (for example, 980 MPa or more or 1180 MPa or more). The upper limit of the tensile strength of the blank is not limited to a specific value and is, for example, 2500 MPa or less. The tensile strength of the press formed product (P) is typically equal to or more than the tensile strength of the blank and may fall within the range presented by way of example in the description. In a case where the member (M) is formed of a steel sheet, the thickness and the tensile strength of the steel sheet can be selected from those that fall within the ranges presented by way of example in the description.

In the case where the blank steel sheet (blank) has the tensile strength of 590 MPa or more, the second step may be carried out by using hot stamping (hot pressing). In the case where the blank has high tensile strength, cold press tends to cause a front end part of the protruding section to crack. To avoid the problem, in the case where a blank having the tensile strength of 590 MPa or more (780 MPa or more, for example) is used, the second step is preferably carried out by using hot stamping. The second step may, of course, be carried out by using hot stamping also in a case where a blank having a tensile strength less than 590 MPa is used. In the case where hot stamping is performed, a blank having a known composition appropriate for the hot stamping may be used.

In a case where the blank has the tensile strength of 590 MPa or more and a wall thickness of 1.4 mm or more, it is particularly preferable to carry out the second step by using hot stamping to prevent the protruding section from cracking. From the same reason, in a case where the blank has the tensile strength of 780 MPa or more and a wall thickness of 0.8 mm or more, it is particularly preferable to carry out the second step by using hot stamping. A heated steel sheet, which has increased ductility, is unlikely to crack even in a case where the blank has a wall thickness of 3.2 mm as long as the second step is carried out by using hot stamping.

The degree of deformation in the first step is typically not so large. The first step can therefore be carried out by using cold working (cold pressing, for example) irrespective of the tensile strength of the blank. Cold working allows precise formation of the press formed product. Cold working further allows omission of the blank heating step, whereby the productivity is increased. It is, however, noted that the first step may be carried out by using hot working (hot stamping, for example) as required. Out of the first and second steps, at least the second step is preferably hot stamping. In a preferable example, the first step is carried out by using cold working, and the second step is carried out by using hot stamping.

An example of the hot stamping will be described below. To perform hot stamping, a workpiece (blank or preformed product) is first heated to a predetermined quenching temperature. The quenching temperature is a temperature more than the A3 transformation point (more specifically, Ac3 transformation point), at which the workpiece is austenitized, and may, for example, be 910° C. or more. The heated workpiece then undergoes press working by using a press machine. Since the workpiece has been heated, large deformation is unlikely to cause the workpiece to crack. When the workpiece undergoes the press working, the workpiece is rapidly cooled. The rapid cooling quenches the workpiece in the press working. The workpiece can be cooled by cooling the press tooling or spraying water via the press tooling toward the workpiece. The procedure of the hot stamping (such as heating and press working) and an apparatus used to perform hot stamping are not limited to a specific procedure or apparatus, and a known procedure and apparatus may be used.

The present embodiment of the present invention will be described below with reference to the drawings. Embodiments described below are presented by way of example, and at least part of the configurations of the following embodiments can be replaced with any of the configurations described above. In the following drawings, similar portions have the same reference character, and no duplicated description will be made in some cases. Further, in the following drawings, a gap is drawn between the steel sheets folded over against each other to form the protruding section for ease of understanding in some cases. It is, however, noted that the steel sheets folded over against each other to form the protruding section are typically in close contact with each other. Similarly, a gap is drawn between two steel sheets fixed to each other in some cases.

First Embodiment

Figure 1:
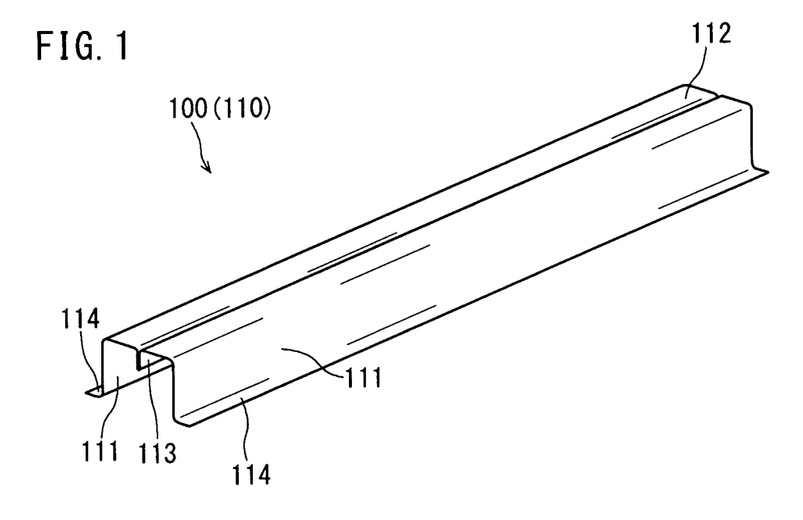
FIG. 1 is a perspective view diagrammatically showing an example of a structural member according to an embodiment of the present invention.
Figure 2:
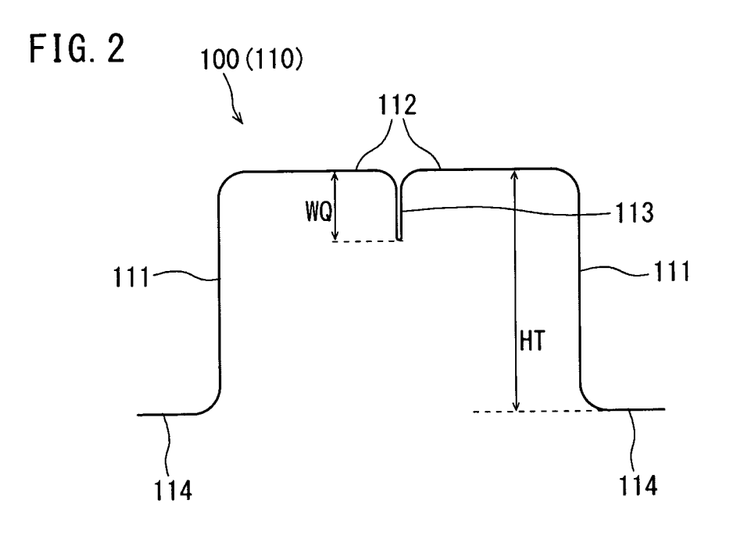
FIG. 2 diagrammatically shows the cross section of the structural member shown in FIG. 1.

In a first embodiment, an example of the structural member (S) will be described. FIG. 1 is a perspective view diagrammatically showing a structural member 100 according to the first embodiment. FIG. 2 diagrammatically shows the cross section of the structural member 100 perpendicular to the longitudinal direction thereof. In the following description, the upper side (side facing top plate section) in FIG. 2 is referred to as the upper side of a press formed product, and the lower side (side facing flange sections) in FIG. 2 is referred to as the lower side of a press formed product in some cases. In the example shown in FIGS. 1 and 2, the structural member (S) is formed only of the press formed product (P), and the press formed product (P) includes flange sections. The structural member (S) according to the present embodiment, however, may include another member (M) and may include no flange section.

The structural member 100 (structural member (S)) includes a press formed product 110 (press formed product (P)). The press formed product 110 is formed of a single steel sheet. The press formed product 110 includes two vertical wall sections 111 and a top plate section 112, which joins the two vertical wall sections to each other. The top plate section 112 is provided with a protruding section 113 (protruding section (Q)), which is the steel sheet extending from the top plate section 112 and so folded over as to protrude. The press formed product 110 further includes two flange sections 114, which extend from the edges of the two vertical wall sections 111, respectively.

The press formed product 110, which includes the two flange sections 114, provides the effect of preventing the vertical wall sections 111 in the vicinity of the flange sections 114 from falling outward when a load acts on the top plate section 112. In other words, if the press formed product 110 includes no flange sections 114, the entire vertical wall sections 111 fall outward, and the strength of the press formed product 110 is unlikely to increase. That is, in a case where the press formed product 110 is, for example, a side sill, the collision characteristic of the press formed product 110 is unlikely to increase.

The protruding section 113 protrudes from the top plate section 112 toward the interior of the press formed product 110 and extends along the longitudinal direction of the press formed product 110. The protruding section 113 protrudes from a roughly central portion of the top plate section 112 roughly perpendicularly to the top plate section 112.

The width WQ of the protruding section 113 (length over which protruding section 113 protrudes from top plate section 112) and the height HT of the vertical wall sections 111 may satisfy the relationship (ratio) described above. The height HT of the vertical wall sections 111 is the length from the edge of each of the vertical wall sections 111 to the top plate section 112, as shown in FIG. 2.

Figure 3:
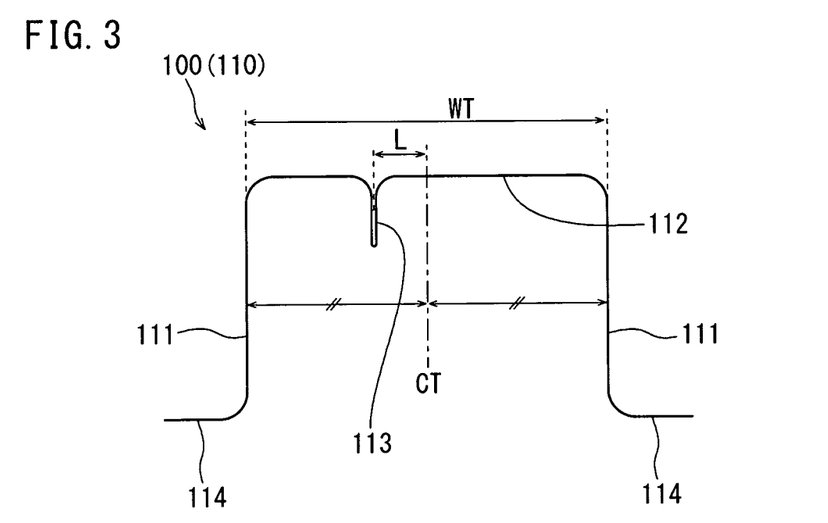
FIG. 3 is a cross-sectional view diagrammatically showing another example of the structural member according to the present embodiment.

FIGS. 1 and 2 show an example in which the protruding section 113 is formed roughly at the center of the top plate section 112. It is, however, noted that the protruding section 113 may be formed in a position different from the center of the top plate section 112, as shown in FIG. 3. The protruding section 113 shown in FIG. 3 is separate by the distance L from a center CT of the top plate section 112 in the width direction.

The structural member 100 may include another member 120 (another member (M)) in addition to the press formed product 110. FIGS. 4A to 4F show examples of the structural member including another member 120. In the structural members 100 shown in FIGS. 4A to 4F, the member 120 is so fixed to the press formed product 110 that the press formed product 110 and the member 120 form a closed cross section.

Figure 4A:
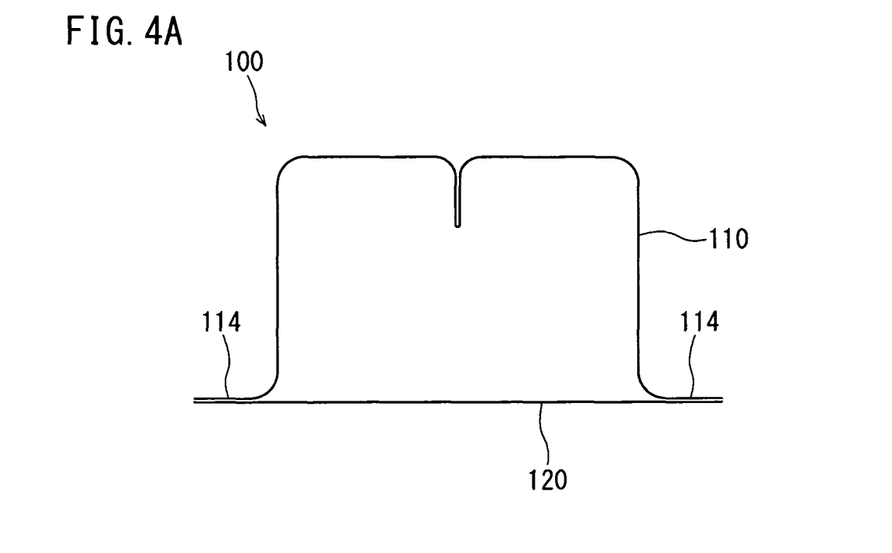
FIG. 4A is a cross-sectional view diagrammatically showing another example of the structural member according to the present embodiment.

The structural member 100 shown in FIG. 4A includes a plate-shaped member 120. The member 120 is fixed to the two flange sections 114 of the press formed product 110.

Figure 4B:
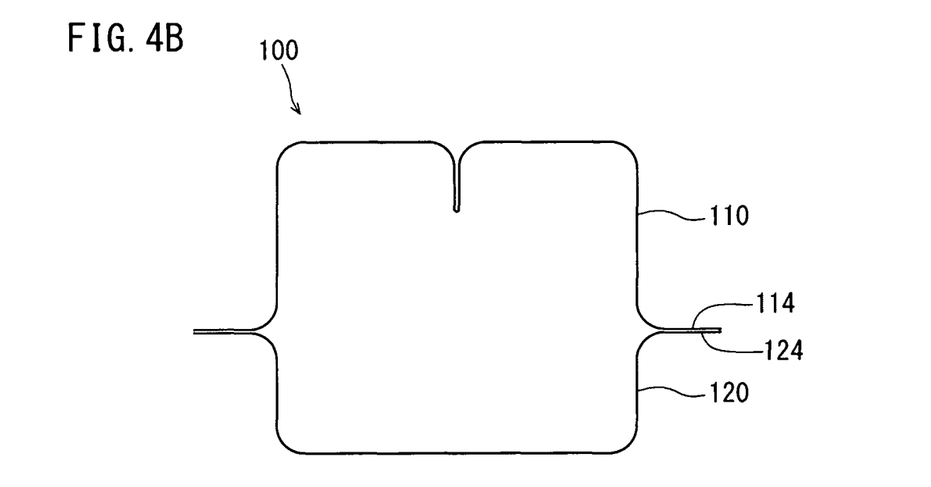
FIG. 4B is a cross-sectional view diagrammatically showing another example of the structural member according to the present embodiment.

The structural member 100 shown in FIG. 4B includes a member 120 having a roughly hat-shaped cross section. The member 120 is a press formed product and includes two flange sections 124. The flange sections 114 of the press formed product 110 and the flange sections 124 of the member 120 are so fixed to each other that the interior of the press formed product 110 and the interior of the member 120 face each other.

Figure 4C:
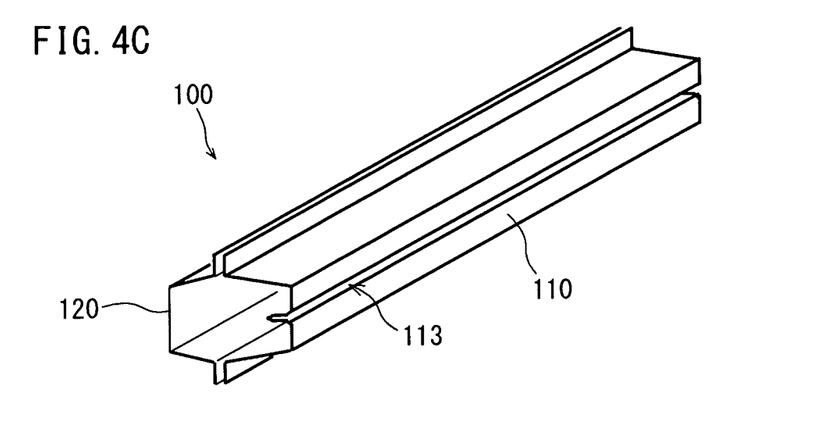
FIG. 4C is a perspective view diagrammatically showing an example of the structural member according to the present embodiment having the cross section shown in FIG. 4B.
Figure 4D:
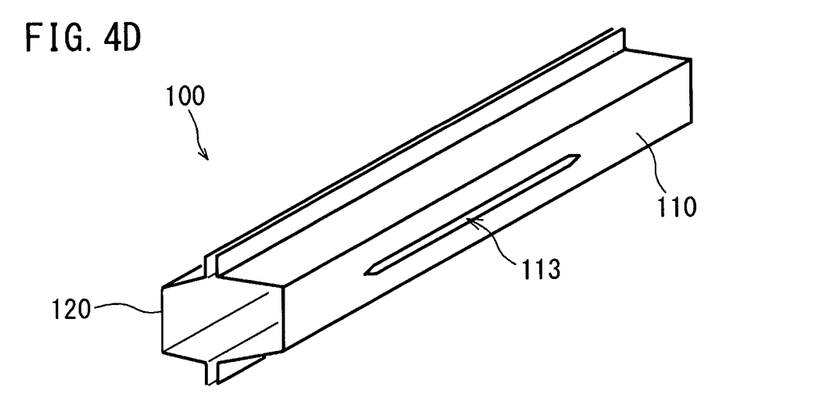
FIG. 4D is a perspective view diagrammatically showing another example of the structural member according to the present embodiment having the cross section shown in FIG. 4B.

FIG. 4C is a perspective view showing an example of the structural member 100 having the cross section shown in FIG. 4B, and FIG. 4D is a perspective view showing another example of the structural member 100 having the cross section shown in FIG. 4B. In the example shown in FIG. 4C, the protruding section 113 is formed over the entire press formed product 110 in the longitudinal direction thereof. In the example shown in FIG. 4D, the protruding section 113 is formed over only part of the press formed product 110 in the longitudinal direction thereof.

Figure 4E:
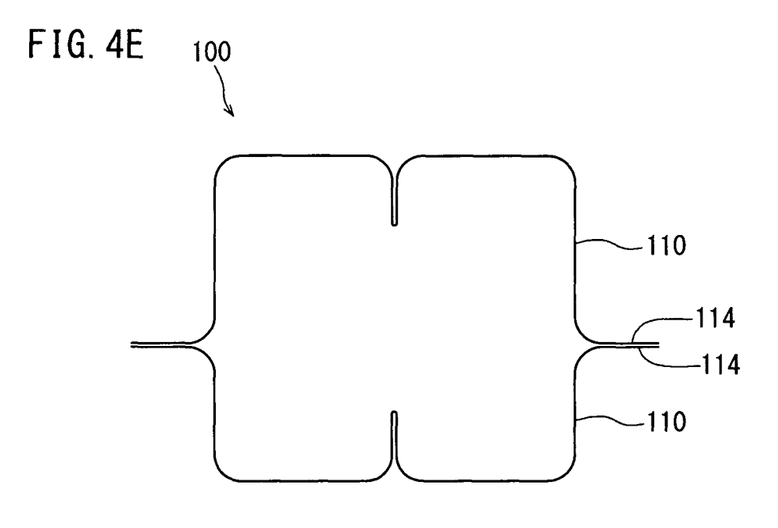
FIG. 4E is a cross-sectional view diagrammatically showing another example of the structural member according to the present embodiment.

The structural member 100 shown in FIG. 4E includes two press formed products 110. One of the two press formed products 110 can be taken as another member 120. The flange sections 114 of the two press formed product 110 are so fixed to each other that the interiors of the two press formed products 110 face each other.

Figure 4F:
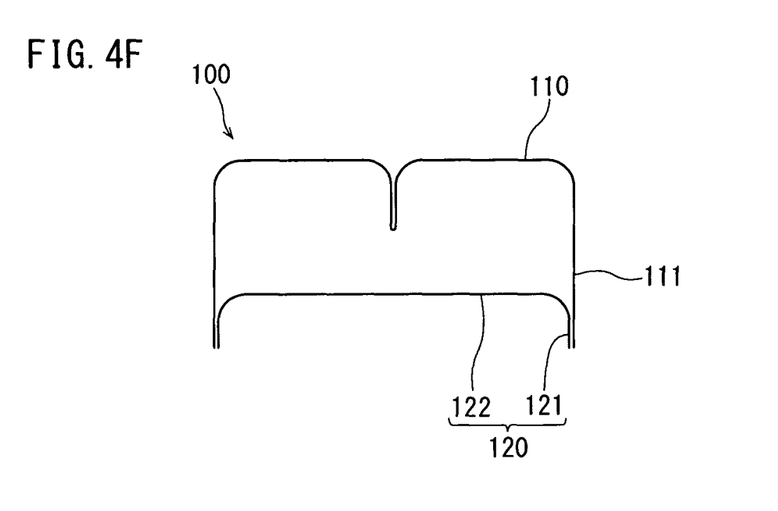
FIG. 4F is a cross-sectional view diagrammatically showing another example of the structural member according to the present embodiment.

The press formed product 110 of the structural member 100 shown in FIG. 4F includes no flange section 114. The member 120 includes two vertical wall sections 121 and a top plate section 122, which joins the vertical wall sections to each other. In the example shown in FIG. 4F, the vertical wall sections 111 of the press formed product 110 are so fixed to the vertical wall sections 121 of the member 120 that the top plate sections are located on the same side of the vertical wall sections.

FIGS. 4A to 4F illustrate a case where the protruding section 113 is formed in a central portion of the top plate section 112. It is, however, noted that the protruding section 113 may be formed in a position other than the central portion of the top plate section 112, as shown in FIG. 3.

Second Embodiment

In a second embodiment, an example of the production method according to the present embodiment will be described. The second embodiment will be described with reference to a case where the press formed product 110 shown in FIGS. 1 and 2 is produced. It is, however, noted that another press formed product 110 can be produced in the same manner. In the case where the structural member 100 includes the member 120, the member 120 may be fixed to the press formed product 110 in an arbitrary method.

A method for producing the press formed product 110 will be described below. First, a single blank steel sheet is deformed to form a preformed product 210 shown in FIG. 5 (first step). The preformed product 210 includes two first sections 211, which form the two vertical wall sections 111, two second sections 212, which form the top plate section 112, a third section 213, which forms the protruding section 113, and two fourth sections 214, which form the two flange sections 114. The third section 213 is disposed between the two second sections 212 and bulges out from the two second sections 212 toward the interior of the preformed product 210. The preformed product 210 can be formed in typical press forming.

Figure 5:
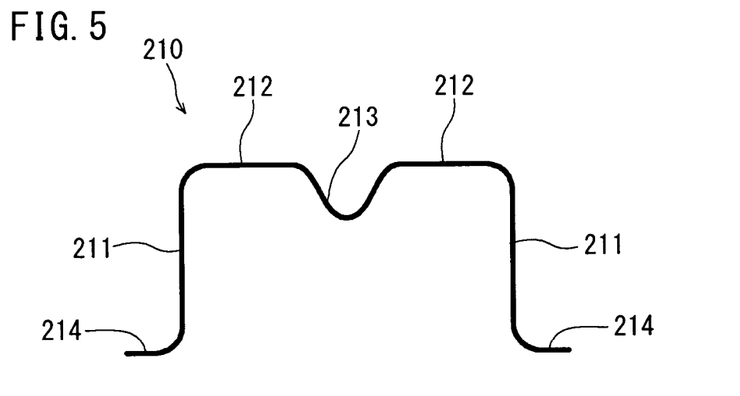
FIG. 5 is a cross-sectional view diagrammatically showing an example of a preformed product produced in a production method according to the present embodiment.

The preformed product 210 is then press-formed to form the two vertical wall sections 111, the top plate section 112, and the protruding section 113 (second step). The second step will be described below.

Figure 6A:
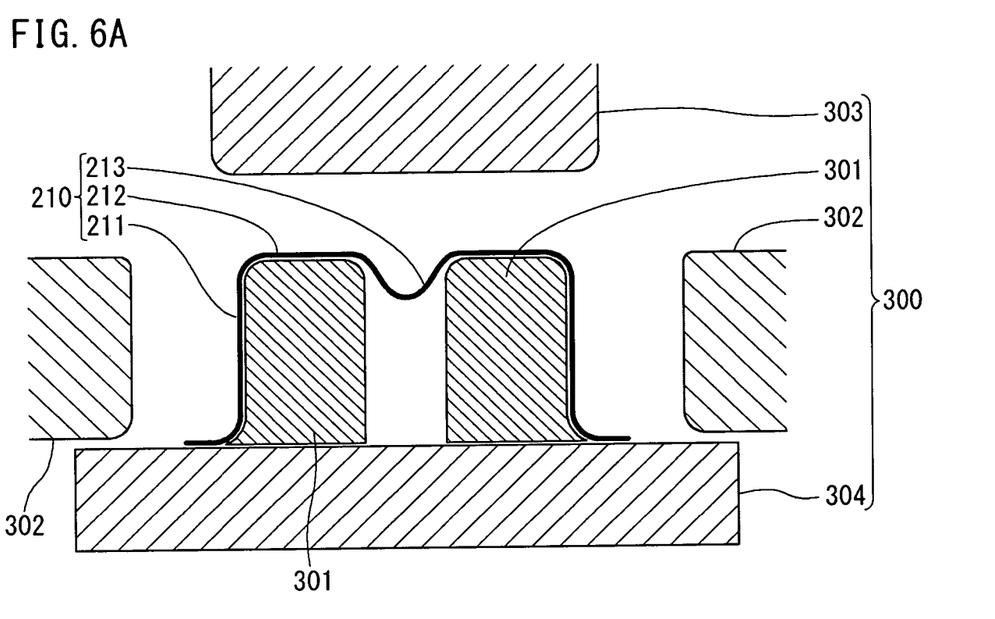
FIG. 6A diagrammatically shows the state in which a second step starts.

FIG. 6A shows a press-forming apparatus 300 used in the second step. The press-forming apparatus 300 includes the two movable punches 301, two sliding dies 302, an upper die 303, and a plate 304. The movable punches 301 slide on the plate 304 in the horizontal direction. The sliding dies 302 also move in the horizontal direction. The sliding dies 302 may be moved by a cam structure driven by downward movement of the upper die 303. The sliding dies 302 may instead be moved by an actuator, such as a hydraulic cylinder.

Figure 6B:
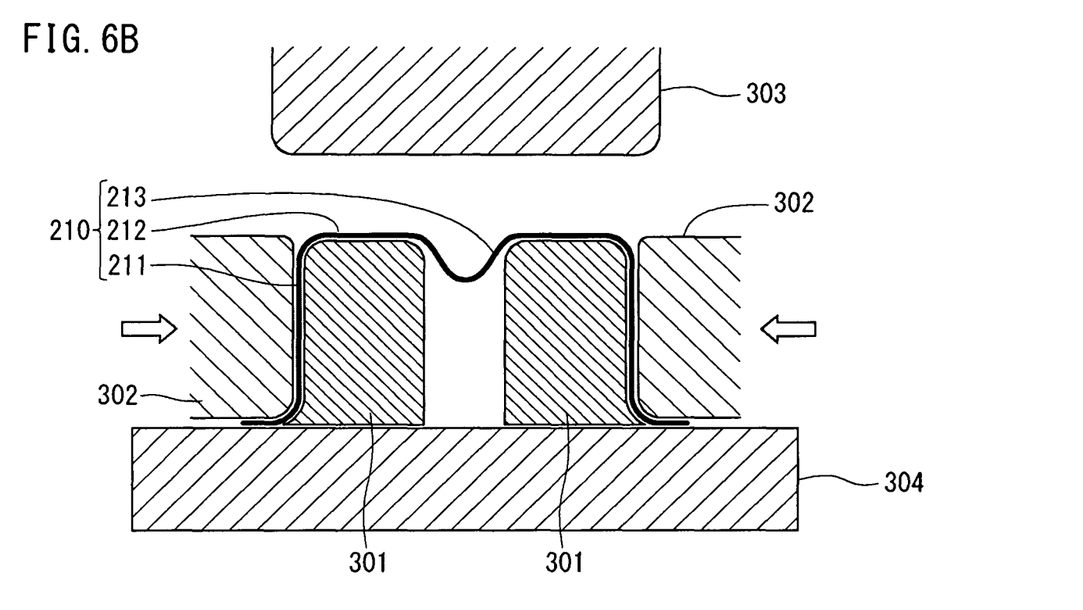
FIG. 6B diagrammatically shows an intermediate state of the second step.
Figure 6C:
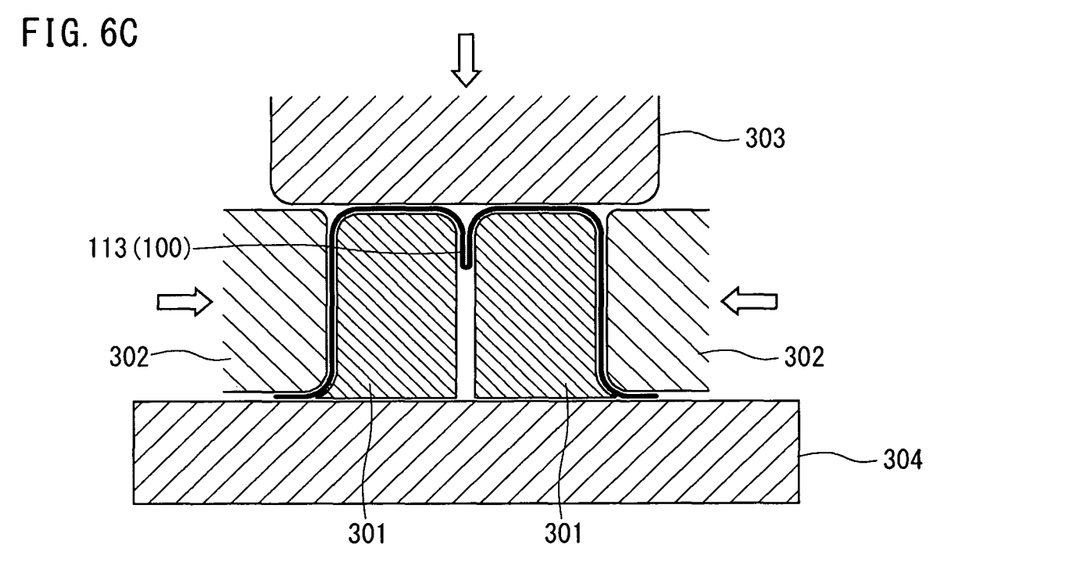
FIG. 6C diagrammatically shows the state of the end of the second step.

In the second step, the preformed product 210 is first placed in the press-forming apparatus 300 (step (i)), as shown in FIG. 6A. In step (i), the movable punches 301 are so disposed in the interior of the preformed product 210 as to sandwich the third section 213. In the example shown in FIG. 6, the two movable punches 301 are disposed along the first section 211 and the second section 212.

Step (ii) is then carried out. FIG. 6B shows an intermediate state of step (ii), and FIG. 6C shows the state of the end of step (ii). The protruding section 113 is formed by pushing the two movable punches 301 from positions outside the two first sections 211 to allow the two movable punches 301 to sandwich the third section 213 (step (ii)), as shown in FIGS. 6B and 6C. Causing the sliding dies 302 to push the first sections 211 pushes the movable punches 301. At this point, the first sections 211 are sandwiched between the movable punches 301 and the sliding dies 302 and move in this state.

The third section 213 sandwiched between the two movable punches 301 is folded over to form the protruding section 113, as shown in FIG. 6C. To carry out step (ii), the upper die 303 is lowered to push the second sections 212, which form the top plate section 112, as shown in FIG. 6C.

The press formed product 110 is thus produced. In the case where the second step is carried out by using hot stamping, the preformed product 210 is heated to a predetermined temperature before the second step. The heating is performed, for example, by heating the preformed product 210 in a heater. Thereafter, in the press-forming performed by the press-forming apparatus 300, the preformed product 210 is cooled during the pressing operation. The press-forming and quenching are thus performed. In this case a coolable press die is used as a pressing die of the press-forming apparatus 300. Such a pressing die has been known. The preformed product 210 may instead be cooled by causing the pressing die to spray water to the preformed product 210.

In a case where the press formed product 110 includes a plurality of protruding sections 113, the preformed product 210 includes third sections 213, the number of which corresponds to the number of protruding sections 113. In this case, three or more movable punches may be used. Each of the third sections 213 sandwiched between two adjacent movable punches forms the corresponding protruding section 113.

EXAMPLES

The present invention will be described in more detail with reference to Examples.

Example 1

In Example 1, the structural member (S) according to the present embodiment underwent a three-point bending test simulation. The simulation is performed by using general-purpose FEM (finite element method) software (produced by LIVERMORE SOFTWARE TECHNOLOGY CORPORATION, model name: LS-DYNA).

Figure 7A:
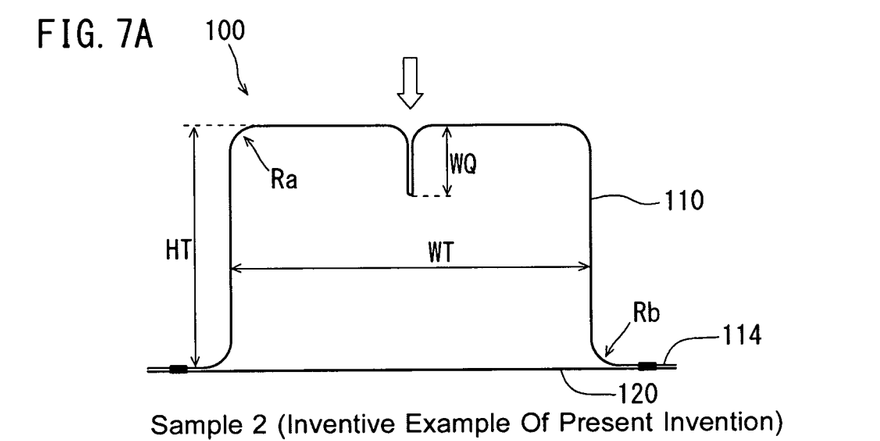
FIG. 7A is a cross-sectional view diagrammatically showing a sample 2 according to Inventive Example of the present invention assumed in the simulation in Example 1.

FIG. 7A is a cross-sectional view of a sample 2 according to Inventive Example of the present invention used in the simulation in Example 1. The structural member 100 shown in FIG. 7A is formed of the press formed product 110 and the plate-shaped member 120 welded to the flange sections 114 of the press formed product 110. The sample shown in FIG. 7A are sized as follows. In the sample 2, the protruding section 113 is formed at the center of the top plate section 112 and further formed over the entire press formed product 110 in the longitudinal direction thereof.

Figure 7B:
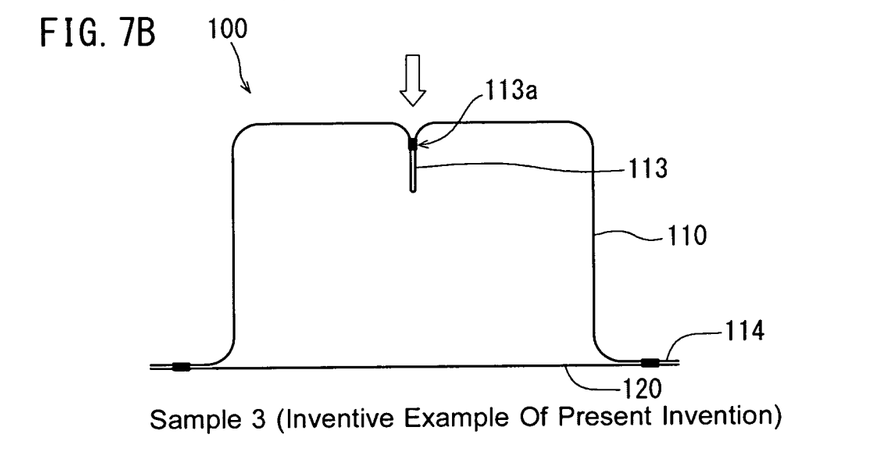
FIG. 7B is a cross-sectional view diagrammatically showing a sample 3 according to Inventive Example of the present invention assumed in the simulation in Example 1.

Width WQ of protruding section: 15 mm
Height HT of vertical wall sections: 60 mm
Distance WT between two vertical wall sections (width of top plate section): 80 mm
Width of member 120: 120 mm
Radius of curvature at corners Ra and Rb: 5 mm
Length of press formed product in longitudinal direction: 800 mm FIG. 7B is a cross-sectional view of a sample 3 according to Inventive Example of the present invention. The sample 3 differs from the sample 2 only in that the steel sheets that form the protruding section 113 are welded to each other via a welding section 113a.

Figure 7C:
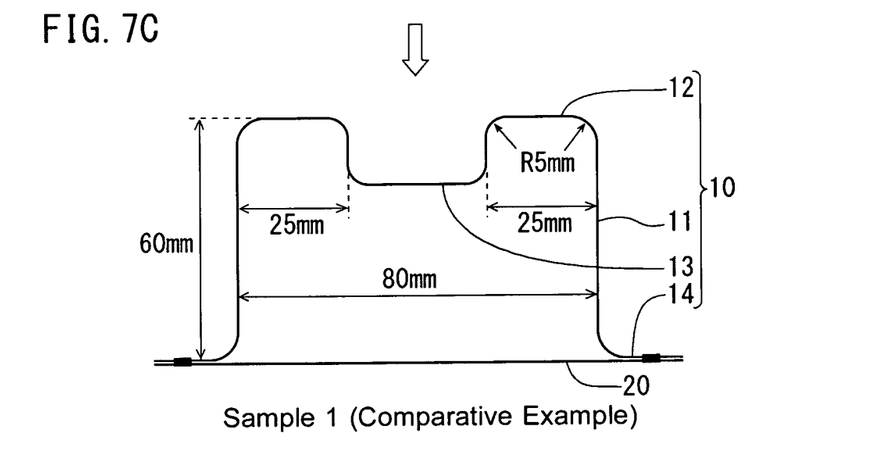
FIG. 7C is a cross-sectional view diagrammatically showing a sample 1 according to Comparative Example assumed in the simulation in Example 1.
Figure 7D:
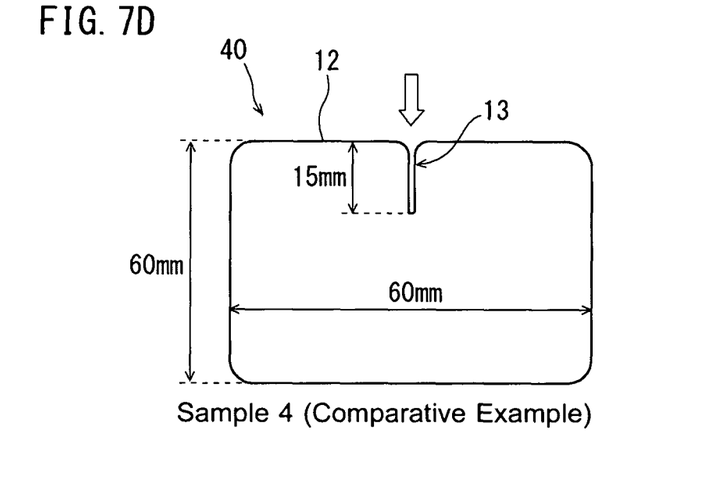
FIG. 7D is a cross-sectional view diagrammatically showing a sample 4 according to Comparative Example assumed in the simulation in Example 1.

A sample 1 diagrammatically shown in FIG. 7C and a sample 4 diagrammatically shown in FIG. 7D are assumed as Comparative Examples. The sample 1 is formed of the press formed product 10 and a plate-shaped member 20 welded to flange sections 114 of the press formed product 10. The press formed product 10 includes two vertical wall sections 11, a top plate section 12, which joins the two vertical wall sections 11 to each other, and flange sections 14. The top plate section 12 of the press formed product 10 is also provided with a protruding section 13, which protrudes toward the interior of the press formed product 10. The steel plates that form the protruding section 13 are, however, not folded over against each other, and the protruding section 13 has a groove-like shape as a whole. FIG. 7C shows the sizes of the sample 1. Reference character R in FIG. 7C denotes the radius of curvature. The sample 4 is assumed to be a member formed in roll forming and having a hollow closed cross section. The sample 4 is therefore formed of a single steel sheet. The protruding section 13 is formed at the center of the top plate section 12 of a roll-formed product 40 and over the entire roll-formed product 40 in the longitudinal direction thereof. The protruding section of the roll-formed product 40 has the same shape as that of the sample 2 according to Inventive Example of the present invention.

It is assumed that the samples 1 to 4 are each formed of a steel sheet having a thickness of 1.4 mm and a tensile strength of 1500 MPa. It is further assumed that the flange sections of each of the press formed products (press formed product 110, 10) and another member (member 120, 20) are fixed to each other by spot welding (at intervals of 40 mm). The simulation was then performed in consideration of breakage of the spot weld zone and rupture of the material thereof. The sample 4 (roll-formed product 40) is assumed to have no seam.

Figure 8:
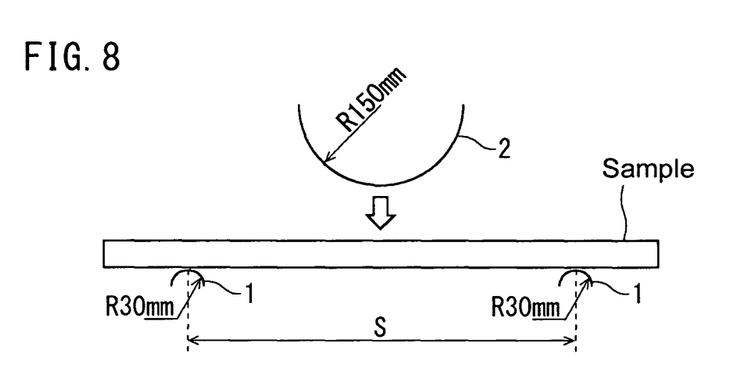
FIG. 8 diagrammatically shows a three-point bending test simulated in Example 1.

FIG. 8 diagrammatically shows a method for performing a three-point bending test used in the simulation. The three-point bending test was performed by placing the sample on the two supporting points 1 and causing an impactor 2 to push the sample from above (side facing top plate section of each sample). The arrows in FIGS. 7A to 7D indicate the direction in which the impactor 2 collides with the sample.

In the three-point bending test, the distance S between the two supporting points 1 was set at 400 mm. The radius of curvature of the supporting points 1 was set at 30 mm. The radius of curvature of the impactor 2 was set at 150 mm. The collision speed of the impactor 2 was set at 7.5 km/h. The width of the impactor 2 (length in direction perpendicular to plane of view of FIG. 8) was so set as to be more than the width of the top plate section of the sample.

Figure 9:
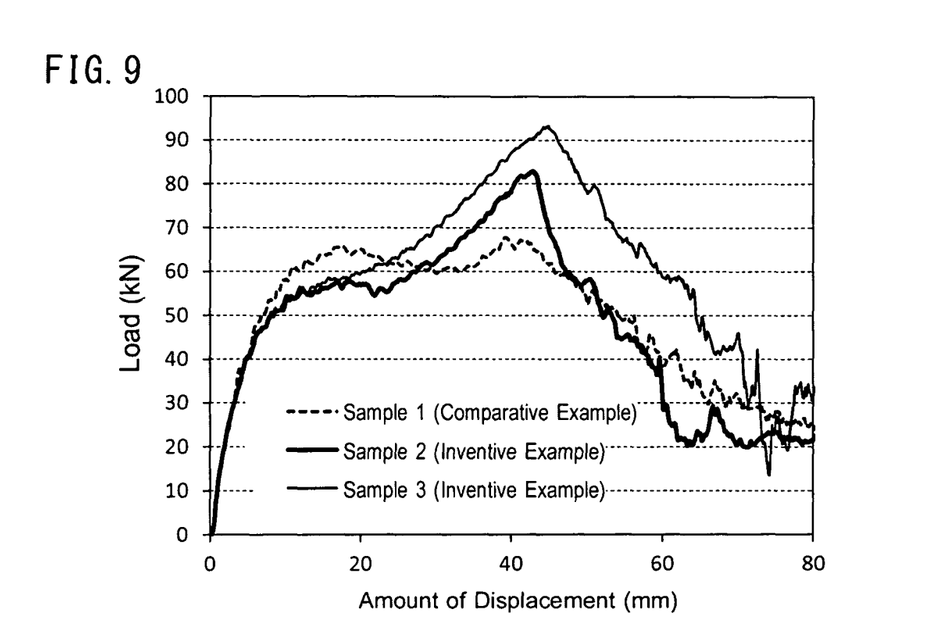
FIG. 9 shows graphs showing an example of results of the simulation in Example 1.
Figure 10:
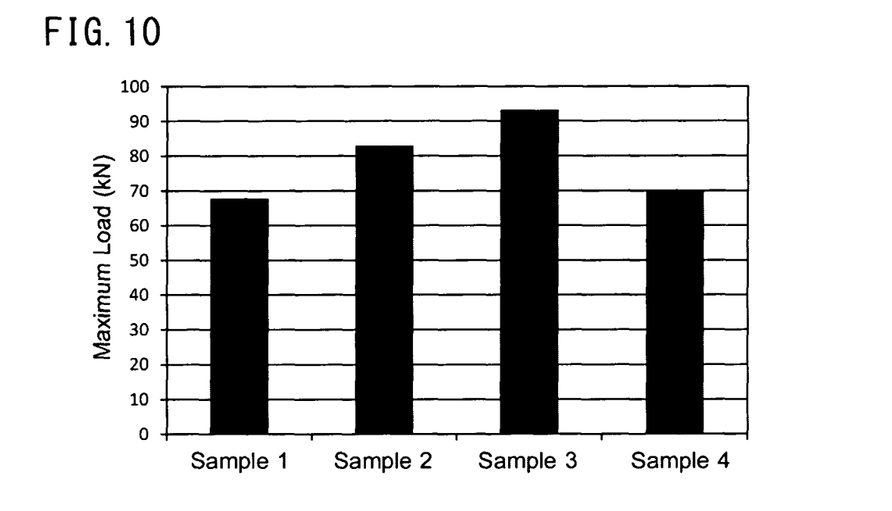
FIG. 10 shows graphs showing another example of the results of the simulation in Example 1.

FIGS. 9 and 10 show results of the simulation. The results of the simulation performed on the sample 4 are shown only in FIG. 10. The horizontal axis of FIG. 9 represents the amount of displacement. The amount of displacement is the distance over which the impactor 2 moves after the impactor 2 comes into contact with the sample. The vertical axis of FIG. 9 represents the load acting on the impactor 2. FIG. 10 shows maximum values of the load.

FIG. 10 shows that the loads produced in the samples 2 and 3 in the Inventive Example of the present invention are more than those in the samples 1 and 4 in Comparative Example, indicating more resistance against collision.

Figure 11A:
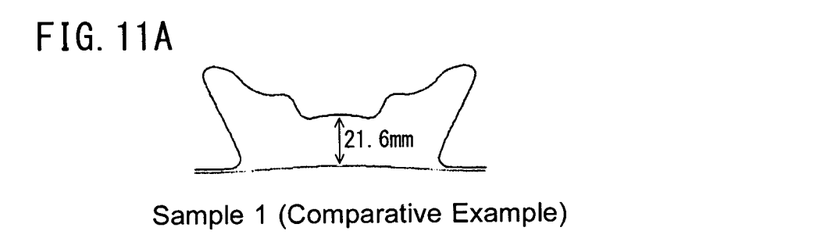
FIG. 11A is a cross-sectional view diagrammatically showing an example of deformation of the sample 1 in the test in Example 1.
Figure 11B:
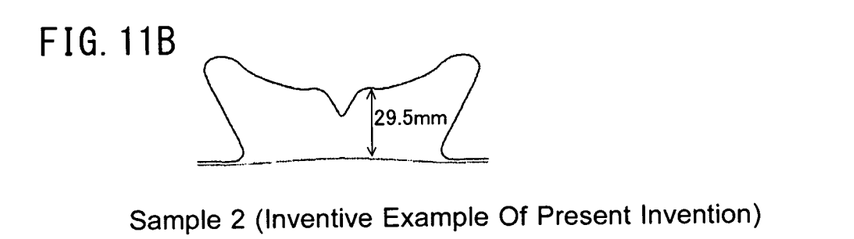
FIG. 11B is a cross-sectional view diagrammatically showing an example of deformation of the sample 2 in the test in Example 1.

FIGS. 11A and 11B show cross-sectional shapes of the sample 1 (Comparative Example) and the sample 2 (Inventive Example of present invention) in a case where the amount of displacement is 40 mm. In the cross section of the sample 1 shown in FIG. 11A, the distance between the bottom of the protruding section 13 and the member 20 was 21.6 mm. In the cross section of the sample 2 shown in FIG. 11B, the distance between the top plate section 112 and the member 20 was 29.5 mm. The results show that the sample 2 has a large moment of inertia of area. That is, the results suggest that the sample 2 in the present example has high resistance against collision as compared with the sample 1 in Comparative Example.

INDUSTRIAL APPLICABILITY

The present invention is applicable to a structural member for automobiles.

REFERENCE SIGNS LIST

100: Structural member
110: Press formed product
111: Vertical wall section
112: Top plate section
113: Protruding section
114: Flange section
115: Protruding section
120: Another member

The invention claimed is:

1. A method for producing a structural member for automobiles, the structural member comprising a press formed product formed of a single steel sheet and having an open cross section,
wherein the press formed product includes
two vertical wall sections, and
a top plate section that joins the two vertical wall sections to each other,
at least part of the top plate section is provided with a protruding section that is the steel sheet extending from the top plate section and so folded over against itself as to protrude, and
the protruding section protrudes from the top plate section toward an interior of the press formed product and extends along a longitudinal direction of the press formed product,
the method comprising:
a first step of forming a preformed product including two first sections that form the two vertical wall sections, two second sections that form the top plate section, and a third section that forms the protruding section by deforming a single blank steel sheet; and
a second step of forming the two vertical wall sections, the top plate section, and the protruding section by press-forming the preformed product,
wherein the third section is disposed between the two second sections and bulges out from the two second sections toward an interior of the preformed product, and
the second step includes
a step (i) of placing two movable punches in the interior of the preformed product in such a way that the two movable punches sandwich the third section, and
a step (ii) of forming the protruding section by pushing the two movable punches externally via the two first sections to allow the two movable punches to sandwich the third section.

2. The production method according to claim 1, wherein out of the first and second steps, at least the second step is hot stamping.

* * * * *